US012619074B2

(12) United States Patent　　　　(10) Patent No.:　US 12,619,074 B2
Lee et al.　　　　　　　　　　　　　(45) Date of Patent:　　　May 5, 2026

(54) SEE-THROUGH TYPE DISPLAY DEVICE AND GLASSES TYPE AUGMENTED REALITY DEVICE INCLUDING THE SAME

(71) Applicant: SAMSUNG ELECTRONICS CO., LTD., Suwon-si (KR)

(72) Inventors: Changkun Lee, Seoul (KR); Jaeseung Chung, Suwon-si (KR); Juwon Seo, Osan-si (KR); Geeyoung Sung, Daegu (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 828 days.

(21) Appl. No.: 16/983,284

(22) Filed: Aug. 3, 2020

(65) Prior Publication Data

US 2021/0109352 A1　　Apr. 15, 2021

(30) Foreign Application Priority Data

Oct. 10, 2019　　(KR) ........................ 10-2019-0125674

(51) Int. Cl.
*G02B 27/00*　　　(2006.01)
*G02B 27/01*　　　(2006.01)
*G02B 27/14*　　　(2006.01)

(52) U.S. Cl.
CPC ......... *G02B 27/0172* (2013.01); *G02B 27/14* (2013.01); *G02B 2027/013* (2013.01);
(Continued)

(58) Field of Classification Search
CPC ................ G02B 27/0172; G02B 27/14; G02B 2027/013; G02B 2027/0132; G02B 2027/0178; G02B 27/144; G02B 3/04; G02B 27/10; G02B 27/01; G02B 27/0101; G02B 27/0103; G02B 27/0149; G02B 27/017; G02B 27/0176; G02B 27/0179; G02B 27/0189; G02B 2027/0105; G02B 2027/0107; G02B 2027/0109;
(Continued)

(56) References Cited

U.S. PATENT DOCUMENTS 5,805,120 A　　9/1998　Yamada et al.
6,353,503 B1　　3/2002　Spitzer et al.
(Continued)

FOREIGN PATENT DOCUMENTS

CN　　109782441 A　　5/2019
CN　　110208950 A　　9/2019
(Continued)

OTHER PUBLICATIONS

"Aspheric lens", Wikipedia, Sep. 3, 2020, pp. 1-7, https://en.wikipedia.org/wiki/Aspheric_lens.
(Continued)

*Primary Examiner* — Henry Duong

(74) *Attorney, Agent, or Firm* — Sughrue Mion, PLLC

(57) ABSTRACT

A see-through type display device includes a display panel configured to generate first image light, a beam splitter configured to reflect the first image light and generate second image light, and a light coupling lens including a first surface on which the second image light is incident and a second surface provided opposite to the first surface, the first surface being aspherical.

9 Claims, 13 Drawing Sheets

(52) U.S. Cl.
CPC ................ *G02B 2027/0132* (2013.01); *G02B 2027/0178* (2013.01)

(58) Field of Classification Search
CPC ...... G02B 2027/011; G02B 2027/0112; G02B 2027/0114; G02B 2027/0116; G02B 2027/0118; G02B 2027/0121; G02B 2027/012; G02B 2027/0123; G02B 2027/0125; G02B 2027/0127; G02B 2027/0129; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019; G02B 2027/0194; G02B 2027/0192; G02B 2027/0196; G02B 2027/0198
USPC ......................................................... 359/630
See application file for complete search history.

(56) References Cited

U.S. PATENT DOCUMENTS

| | | | | |
|---|---|---|---|---|
| 9,244,279 | B1* | 1/2016 | Fergason | ........... G02B 27/0172 |
| 2008/0304010 | A1* | 12/2008 | Keane | ..................... G02C 7/02 |
| | | | | 351/159.01 |

| | | | | |
|---|---|---|---|---|
| 2012/0119978 | A1* | 5/2012 | Border | ............... G02B 27/0172 |
| | | | | 345/8 |
| 2013/0257689 | A1* | 10/2013 | Hotta | ........................ G02B 5/02 |
| | | | | 345/8 |
| 2015/0253586 | A1* | 9/2015 | Amir | ...................... G02C 7/068 |
| | | | | 351/159.77 |
| 2017/0176751 | A1 | 6/2017 | Ouderkirk et al. | |
| 2017/0343822 | A1* | 11/2017 | Border | ................. G02B 5/3083 |
| 2018/0035101 | A1* | 2/2018 | Osterhout | .......... G02B 27/0172 |
| 2018/0239141 | A1* | 8/2018 | Cakmakci | .............. G02B 17/08 |
| 2019/0219818 | A1* | 7/2019 | Mattinson | ............ G02B 27/283 |
| 2020/0050008 | A1 | 2/2020 | Seo et al. | |
| 2020/0096816 | A1 | 3/2020 | Lee et al. | |
| 2021/0208399 | A1 | 7/2021 | Wei | |

FOREIGN PATENT DOCUMENTS

| | | | |
|---|---|---|---|
| CN | 110865456 | A | 3/2020 |
| CN | 110941088 | A | 3/2020 |
| EP | 3 627 211 | A1 | 3/2020 |
| JP | 6-118336 | A | 4/1994 |
| JP | 2000-121988 | A | 4/2000 |
| JP | 2006-65091 | A | 3/2006 |
| JP | WO2014/061138 | A1 | 9/2016 |
| JP | 2016-224461 | A | 12/2016 |
| KR | 10-2009-0017212 | A | 2/2009 |

OTHER PUBLICATIONS

Communication dated Feb. 22, 2021, issued by the European Patent Office in European Application No. 20200853.8.
Communication dated Feb. 6, 2024, issued by the China National Intellectual Property Administration in Chinese Application No. 202011015446.3.
Communication dated Sep. 25, 2024, issued by Korean Intellectual Property Office in Korean Patent Application No. 10-2019-0125674.

* cited by examiner

SEE-THROUGH TYPE DISPLAY DEVICE AND GLASSES TYPE AUGMENTED REALITY DEVICE INCLUDING THE SAME

CROSS-REFERENCE TO RELATED APPLICATION

This application claims priority from Korean Patent Application No. 10-2019-0125674, filed on Oct. 10, 2019 in the Korean Intellectual Property Office, the disclosure of which is incorporated herein in its entirety by reference.

BACKGROUND

1. Field

Example embodiments of the present disclosure relate to see-through type display devices and glasses type augmented reality devices.

2. Description of Related Art

Recently, as electronic devices and display devices capable of realizing virtual reality (VR) have been developed, interest in VR has increased. As a next step of VR, technologies (methods) that may realize augmented reality (AR) and mixed reality (MR) have been studied.

Unlike VR that premises a complete virtual world, AR is a display technique that further increases an effect of reality by overlapping and combining imaginal objects or information on an environment of the real world. Considering that VR is limitedly applicable to a field, such as games or virtual experiences, AR may be applicable to various real environments. In particular, AR is drawing the attention as a next generation display technique suitable for a ubiquitous environment or an internet of things (IoT) environment. AR may be an example of MR in that AR mixes the real world and additional information such as virtual world information.

SUMMARY

One or more example embodiments provide see-through type display devices including a light combining lens having a high degree of freedom in curvature selection.

One or more example embodiments also provide glasses type augmented reality devices including a light combining lens in the lens position of glasses.

Additional aspects will be set forth in part in the description which follows and, in part, will be apparent from the description, or may be learned by practice of example embodiments of the disclosure.

According to an aspect of an example embodiment, there is provided a see-through type display device including a display panel configured to generate first image light, a beam splitter configured to reflect the first image light and generate second image light, and a light coupling lens including a first surface on which the second image light is incident and a second surface provided opposite to the first surface, the first surface being aspherical.

The first surface may include a first region on which the second image light is incident, and a second region surrounding the first region, wherein the first region includes a first curved profile, and wherein the second region includes a second curved profile that is different from the first curved profile.

A second curvature of the second region may be smaller than a first curvature of the first region.

A first radius of curvature of the first region may be equal to or greater than 30 mm and is smaller than or equal to 50 mm, and a second radius of curvature of the second region may be greater than the radius of curvature of the first region and is smaller than or equal to 200 mm.

A position of an upper boundary of the first region may be determined based on relative positions of the display panel and the beam splitter, and the relative positions of the display panel and the beam splitter may be determined such that the second image light passing through a region closest to the display panel is incident on the upper boundary of the first region.

A position of an upper boundary of the first region may be determined based on relative positions of the display panel and the beam splitter, and the relative positions of the display panel and the beam splitter may be determined such that the second image light generated from an inside of an upper boundary of the beam splitter reaches the upper boundary of the first region.

The display panel may be parallel to a central axis of the first region.

The first surface may further include a plurality of regions having different curved profiles, respectively, the plurality of regions being provided between the second region and the first region.

A curvature of a region among the plurality of regions that is closest to the first region may be closest to a curvature of the first region among curvatures of the plurality of regions.

A center of the first region may overlap a center of the first surface.

A center of the first region and a center of the first surface may be spaced apart from each other.

An incidence surface of the beam splitter that is configured to receive the first image light may be planar.

An incidence surface of the beam splitter that is configured to receive the first image light may be concave.

The see-through type display device may further include a focusing lens provided between the display panel and the beam splitter.

The display panel may be non-parallel with the central axis of the first region.

The second surface may be aspherical.

A curved profile of the second surface may be opposite to a curved profile of the first surface.

According to another aspect of an example embodiment, there is provided a see-through type display device including an image generator configured to generate first image light, a light path converting device configured to reflect the first image light to generate second image light, and a light combining device configured to reflect and focus the second image light, wherein the light combining device includes an inner lens adjacent to the light path converting device, and an outer lens provided opposite to the light path converting device with respect to the inner lens, wherein an inner surface of the outer lens and an outer surface of the inner lens are bonded to each other, wherein each of the inner surface of the outer lens and the outer surface of the inner lens is aspherical, and wherein an outer surface of the outer lens has a single curved profile.

The inner surface of the outer lens may include a first region having a first curved profile, and a second region having a second curved profile that is different from the first curved profile, and wherein the second region surrounds the first region.

A second curvature of the second region may be smaller than a first curvature of the first region.

A curved profile of the outer surface of the inner lens may be opposite to a curved profile of the inner surface of the outer lens.

A radius of the inner lens may be equal to a radius of the outer lens.

A radius of the inner lens may be smaller than a radius of the outer lens.

The inner lens may be provided on the first region, and the second region may be exposed by the inner lens.

The outer lens may cover a side surface of the inner lens, and wherein the side surface of the inner lens connects the outer surface of the inner lens to an inner surface of the inner lens provided opposite to the outer surface of the inner lens.

The second region may be coplanar with the inner surface of the inner lens.

A curvature of the second region may be equal to a curvature of the inner surface of the inner lens.

According to yet another aspect of an example embodiment, there is provided a glasses type augmented reality (AR) device including a pair of temples, a bridge configured to connect the pair of temples, and a pair of light coupling lenses provided between the pair of temples, wherein the pair of light coupling lenses includes an inner surface facing a user and an outer surface provided opposite to the inner surface, and wherein the inner surface is aspherical.

The glasses type AR device may further include a display panel configured to emit virtual image light, and a pair of beam splitters configured to reflect the virtual image light to the pair of light coupling lenses, wherein the inner surface includes a first region on which the reflected virtual image light is incident, and a second region surrounding the first region, wherein the first region has a first curved profile, and wherein the second region has a second curved profile that is different from the first curved profile.

A curvature of the second region may be smaller than a curvature of the first region.

A radius of curvature of the first region may be equal to or greater than 30 mm and smaller than or equal to 50 mm, and a radius of curvature of the second region may be greater than 50 mm and is smaller than or equal to 200 mm.

The pair of beam splitters may be respectively provided between the pair of light coupling lenses and between both eyes of a user.

The reflected virtual image light may be reflected by the pair of light coupling lenses and provided to the user, and real image light emitted from a real object may be incident on the outer surface, passes through the pair of light coupling lenses, and is provided to the user

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
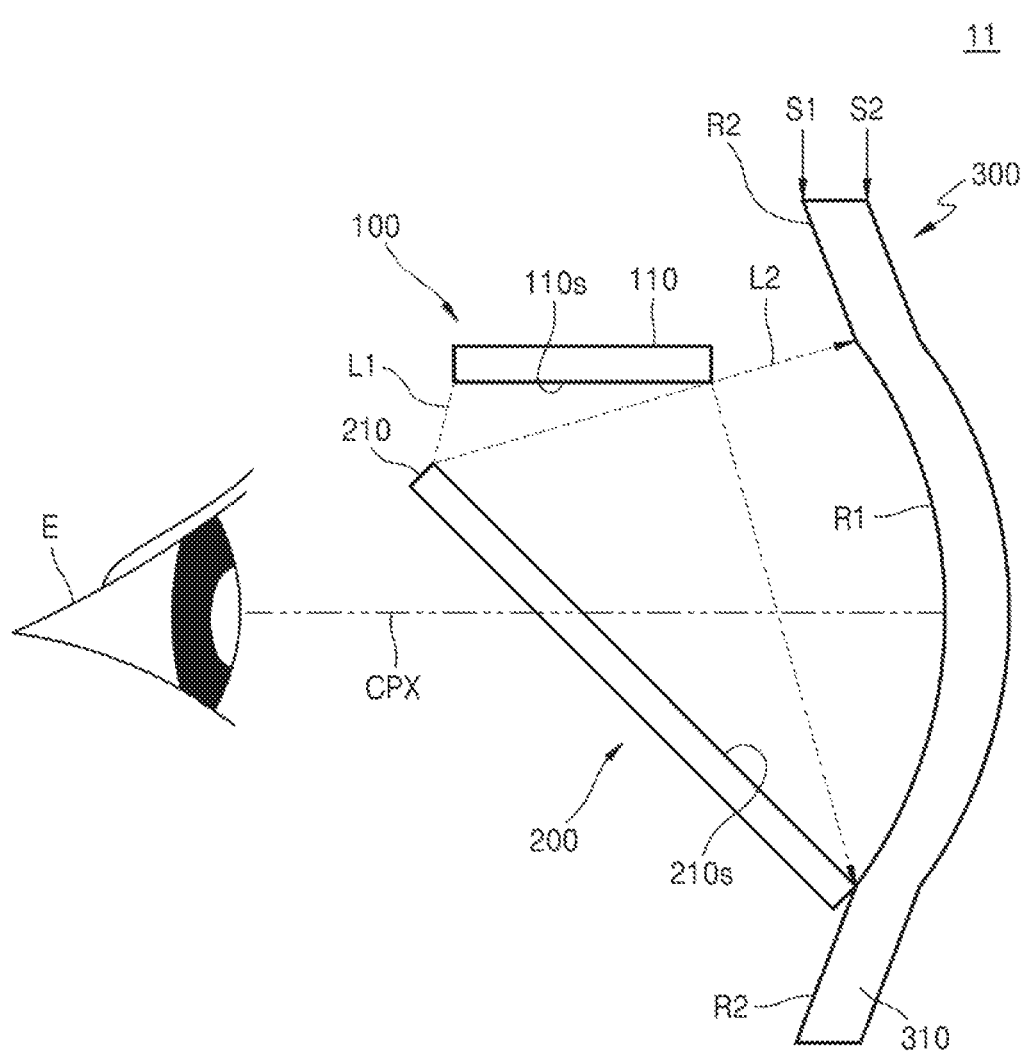
FIG. 1 is a conceptual diagram of a see-through type display device according to an example embodiment.

Reference will now be made in detail to example embodiments of which are illustrated in the accompanying drawings. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the drawings, like reference numerals may refer to like elements throughout and sizes of constituent elements may be exaggerated for convenience of explanation and the clarity of the specification.

It will also be understood that when an element is referred to as being "on" or "above" another element, the element may be in direct contact with the other element or other intervening elements may be present.

In the following example embodiments, the singular forms include the plural forms unless the context clearly indicates otherwise. It should be understood that, when a part "comprises" or "includes" an element in the specification, unless otherwise defined, other elements are not excluded from the part and the part may further include other elements.

Also, in the specification, the term "units" or " . . . modules" denote units or modules that process at least one function or operation, and may be realized by hardware, software, or a combination of hardware and software.

Figure 2:
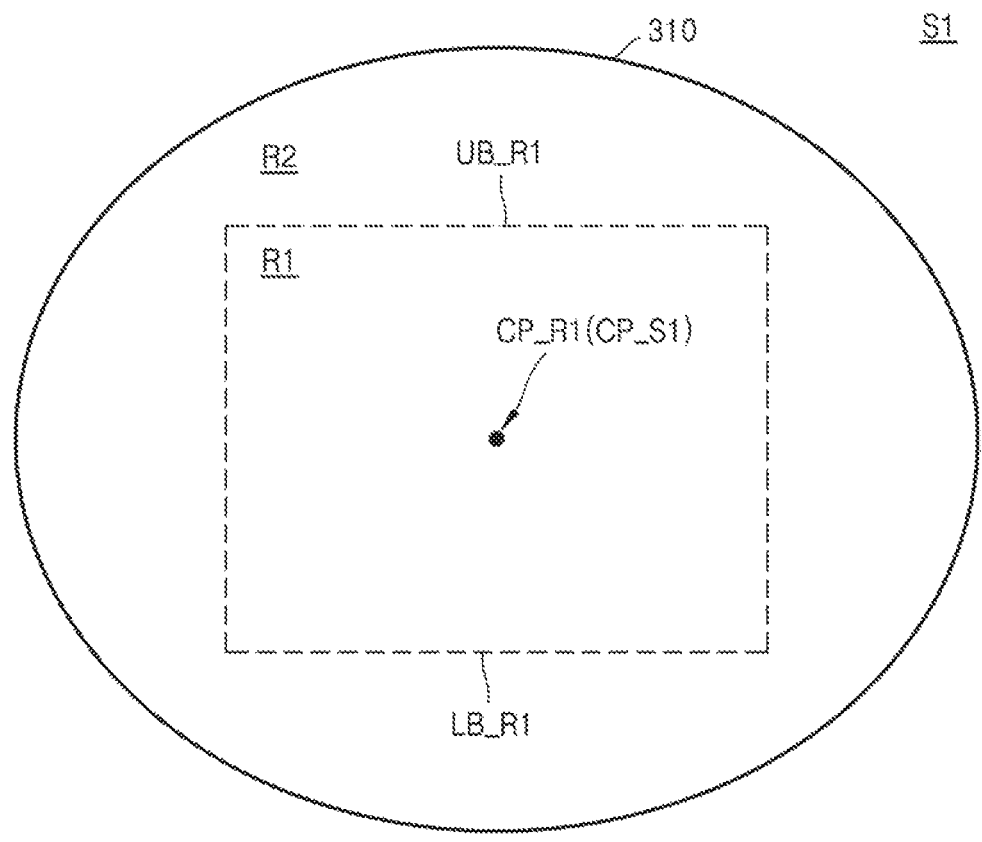
FIG. 2 is a diagram illustrating a first surface of a light combining lens of the see-through type display device of FIG. 1.
Figure 3:
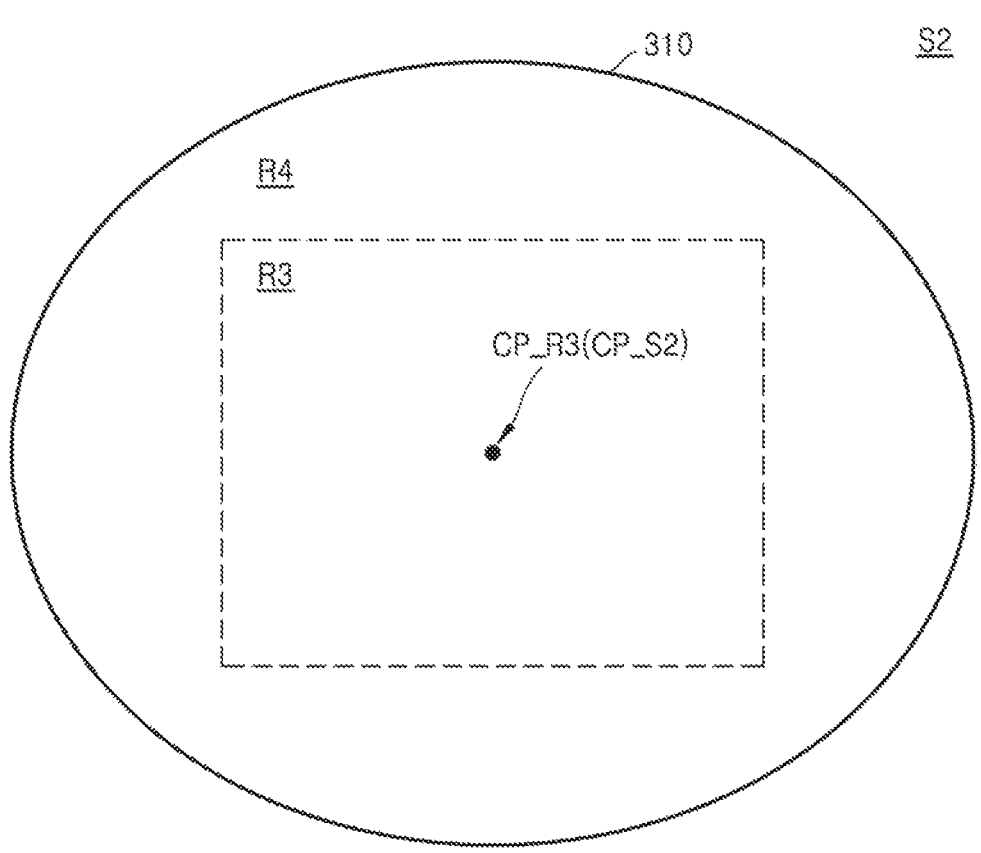
FIG. 3 is a diagram illustrating a second surface of the light combining lens of the see-through type display device of FIG. 1.

FIG. 1 is a conceptual diagram of a see-through type display device 11 according to an example embodiment. FIG. 2 is a diagram illustrating a first surface of a light combining lens 310 of the see-through type display device 11 of FIG. 1. FIG. 3 is a diagram illustrating a second surface of the light combining lens 310 of the see-through type display device 11 of FIG. 1.

Referring to FIGS. 1, 2, and 3, the see-through type display device 11 may include an image generator 100, a light path converting device 200, and a light combining device 300. The image generator 100 may include a display panel 110. The display panel 110 may emit first image light L1. The display panel 110 may generate first image light L1 based on image information received from a controller. For example, the display panel 110 may include liquid crystal on silicon (LCoS). The display panel 110 may provide the first image light L1 to the light path converting device 200.

The light path converting device 200 may reflect a part of the first image light L1 and transmit the other part of the first image light L1. Hereinafter, the part of the first image light L1 reflected by the light path converting device 200 is referred to as second image light L2. The light path converting device 200 may include a beam splitter 210. The beam splitter 210 is shown as a plate beam splitter, but is not limited thereto. In another example, the beam splitter 210 may include a cube beam splitter. The beam splitter 210 may include an incidence surface 210s that receives the first image light L1. The incidence surface 210s may be a plane. The light path converting device 200 may provide the second image light L2 to the light combining device 300.

The light combining device 300 may reflect and focus the second image light L2. The light combining device 300 may include the light combining lens 310. The light combining lens 310 may include a first surface S1 that receives the second image light L2 and a second surface S2 disposed opposite to the first surface S1. The first surface S1 may face the light path converting device 200.

The first surface S1 may include a first region R1 and a second region R2 that are different from each other. As illustrated in FIG. 2, the first region R1 may be surrounded by the second region R2. The first region R1 may be a region where the second image light L2 reaches the first surface S1. In other words, the boundary of the first region R1 may be a boundary of a region where the second image light L2 reaches the first surface S1. A center CP_R1 of the first region R1 may overlap a center CP_S1 of the first surface S1. A central axis CPX of the first region R1 may be parallel to an emission surface 110s through which the display panel 110 emits the first image light L1. The shape of the first region R1 may correspond to the shape of a region where the first image light L1 is emitted from the display panel 110. For example, when the first image light L1 is emitted from a rectangular region in the display panel 110, the shape of the first region R1 may also be rectangular.

The first surface S1 may be aspherical. The first region R1 may have a first curved profile. The second region R2 may have a second curved profile that is different from the first curved profile. A curved profile may be determined by the aspherical equation below.

$$z(r) = \frac{r^2}{R\left(1 + \sqrt{1 - (1+\kappa)\dfrac{r^2}{R^2}}\right)} + \alpha_4 r^4 + \alpha_6 r^6 + \dots , \dots \quad \text{[Equation 1]}$$

In Equation 1, r is a position from center, R is radius of curvature, κ is a conic constant, and ai is an aspherical coefficient.

For example, the first curved profile may have a surface profile of a sphere having a conic constant of 0 in Equation 1. The second curved profile may have a surface profile of an ellipsoid having a conic constant greater than 1. However, the first curved profile and the second curved profile are not limited thereto. There may be various combinations of the first curved profile and the second curved profile.

The first region R1 may have a first curvature and a first radius of curvature. The second region R2 may have a second curvature and a second radius of curvature. The first curvature may be greater than the second curvature. In other words, the first radius of curvature may be smaller than the second radius of curvature. For example, the first radius of curvature may be between about 30 millimeters (mm) and about 50 millimeters (mm). For example, the second radius of curvature may be greater than the first radius of curvature but may be less than or equal to about 200 millimeters (mm).

The first region R1 may have an upper boundary UB_R1. The upper boundary UB_R1 of the first region R1 may be a boundary of the first region R1 closest to the display panel 110. The position of the upper boundary UB_R1 of the first region R1 may be determined according to the relative positions of the display panel 110 and the beam splitter 210. The relative positions of the display panel 110 and the beam splitter 210 may be determined such that the second image light L2 passing through the region closest to the display panel 110 reaches the first region R1 of the first region R1. For example, the relative position of the display panel 110 and the beam splitter 210 may be determined such that the second image light L2 passing through the region closest to the display panel 110 reaches the upper boundary of the first region R1. The second image light L2 passing through the region closest to the display panel 110 may be a marginal ray. In an example, the second image light L2 passing through the region closest to the display panel 110 may be generated by reflecting the first image light L1 from the upper boundary of the beam splitter 210. In another example, the second image light L2 passing through the region closest to the display panel 110 may be generated by reflecting the first image light L1 from the inside of the upper boundary of the beam splitter 210.

The first region R1 may have a lower boundary LB_R1. The lower boundary LB_R1 of the first region R1 may be disposed opposite to the upper boundary UB_R1 of the first region R1. The position of the lower boundary LB_R1 of the first region R1 may be determined according to the relative positions of the display panel 110 and the beam splitter 210. The position of the lower boundary LB_R1 of the first region R1 may be determined such that the second image light L2 generated by reflecting the first image light L1 from the lower boundary of the beam splitter 210 reaches the first region R1. For example, the position of the lower boundary LB_R1 of the first region R1 may be determined such that the second image light L2 generated by reflecting the first image light L1 from the lower boundary of the beam splitter 210 reaches the lower boundary LB_R1 of the first region R1.

The second surface S2 may include a third region R3 and a fourth region R4 that are different from each other. As shown in FIG. 3, the third region R3 may be surrounded by the fourth region R4. The third region R3 may be disposed opposite to the first region R1 of the first surface S1. The fourth region R4 may be disposed opposite to the second region R2 of the first surface S1. A center CP_R3 of the third region R3 may overlap a center CP_S2 of the second surface S2. The shape of the third region R3 may correspond to the shape of the first region R1. For example, the shape of the third region R3 may be substantially the same as the shape of the first region R1.

The second surface S2 may be aspherical. The third region R3 may have a third curved profile. In an example, the third curved profile may be the same as the first curved profile. In another example, the third curved profile may be different from the first curved profile. The fourth region R4 may have a fourth curved profile that is different from the third curved profile. In an example, the fourth curved profile may be the same as the second curved profile. In another example, the fourth curved profile may be different from the second curved profile. The third region R3 may have a third curvature and a third radius of curvature. The fourth region R4 may have a fourth curvature and a fourth radius of curvature. The third curvature may be greater than the fourth curvature. In other words, the third radius of curvature may be smaller than the fourth radius of curvature.

However, the second surface S2 is not limited to an aspherical surface. In another example, the second surface S2 may have a single curved profile. That is, the third curved profile, the third curvature, and the third radius of curvature may be substantially the same as the fourth curved profile, the fourth curvature, and the fourth radius of curvature, respectively.

Example embodiments may provide the see-through type display device 11 including the light combining lens 310 having a reduced curvature. Example embodiments may provide the see-through type display device 11 including the light combining lens 310 having a relatively high degree of freedom in curvature selection.

Figure 4:
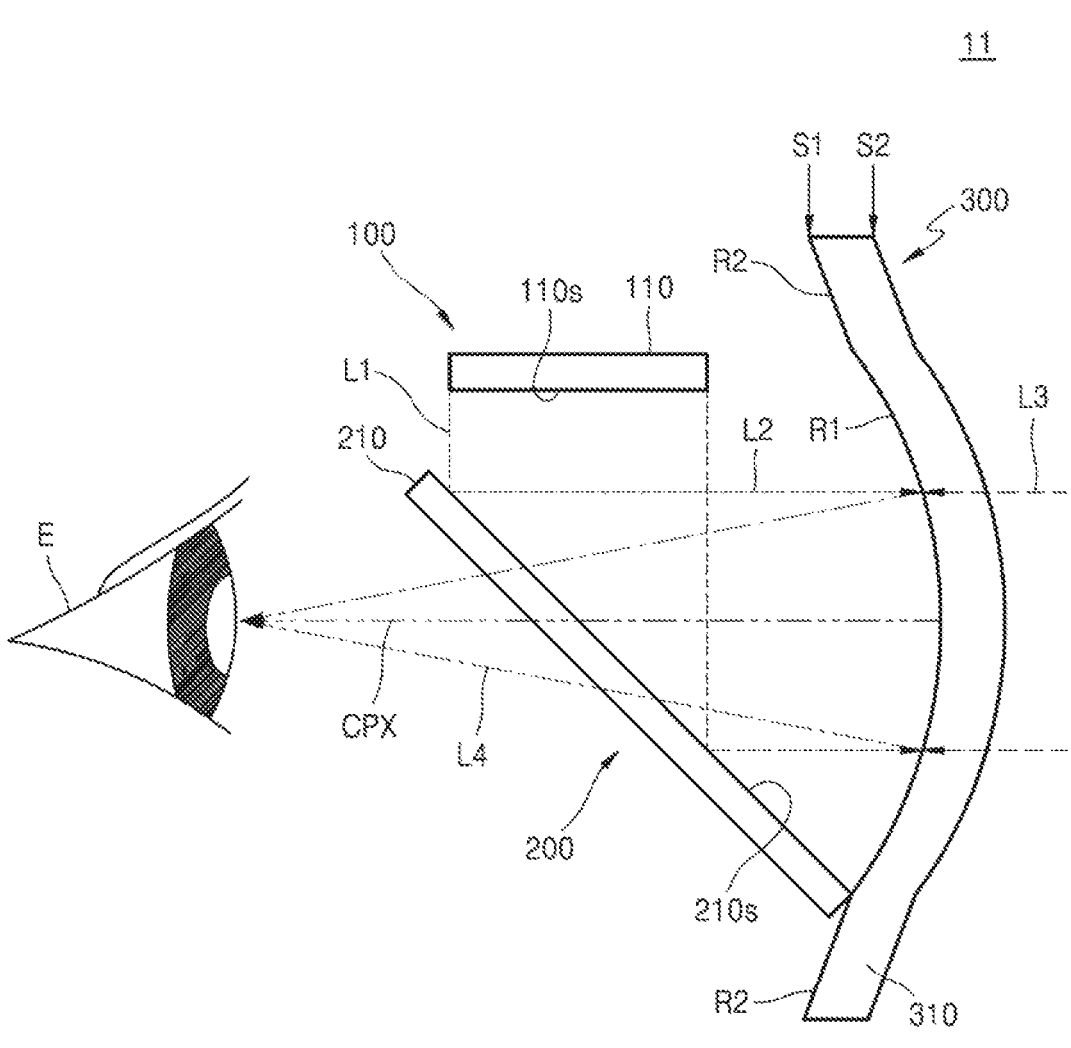
FIG. 4 is a conceptual diagram for describing a method of driving a see-through type display device.

FIG. 4 is a conceptual diagram for describing a method of driving the see-through type display device 11. For brevity of description, substantially the same descriptions as provided with reference to FIGS. 1 to 3 may not be provided.

Referring to FIG. 4, the first image light L1 may be emitted from the display panel 110. The display panel 110 may receive image information from a controller and generate the first image light L1 based on the image information. The display panel 110 may provide the first image light L1 to the beam splitter 210.

A part of the first image light L1 may be reflected by the beam splitter 210 to generate the second image light L2. The second image light L2 may travel in a direction parallel to the central axis CPX of the first region R1. The beam splitter 210 may provide the second image light L2 to the first region R1 of the light combining lens 310.

Ambient image light L3 may be incident on the second surface S2 of the light combining lens 310. The ambient image light L3 may be image light emitted from an object around the see-through type display device 11. For example, the ambient image light L3 may be incident to the third region R3 of the second surface S2. The ambient image light L3 may pass through the light combining lens 310. With respect to the ambient image light L3, the light combining lens 310 may be a positive meniscus lens.

The light combining lens 310 may collect the second image light L2 on a first focus point. The light combining lens 310 may collect the ambient image light L3 on a second focus point. The first focus point may be substantially the same as the second focus point. The second image light L2 and the ambient image light L3 may be combined with each other to generate combination light L4. The first focus point and the second focus point may be disposed adjacent to the pupil of the eye E of a user of the see-through type display device 11. The user may receive the combination light L4. Accordingly, the user may obtain information about a generated image, such as a virtual image, and information about surrounding images, such as a real image, from a controller.

Figure 5:
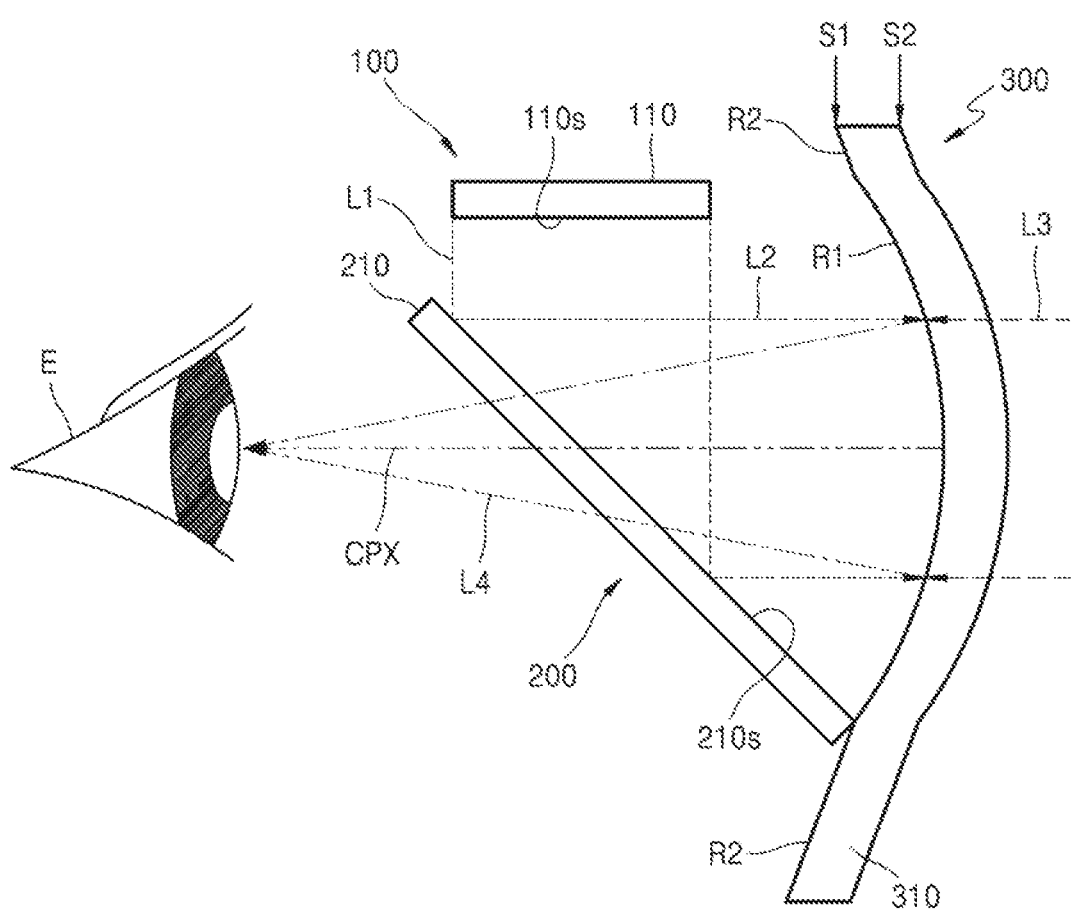
FIG. 5 is a conceptual diagram of a see-through type display device according to an example embodiment.
Figure 6:
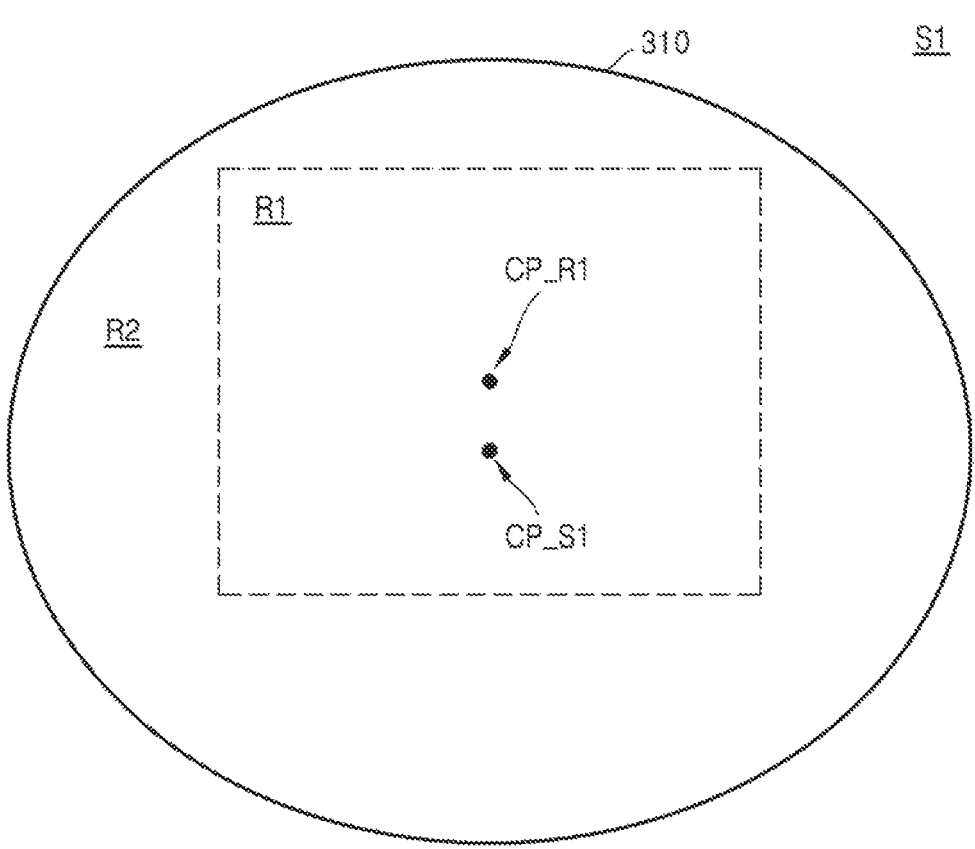
FIG. 6 is a diagram for describing a first surface of the see-through type display device of FIG. 5.
Figure 7:
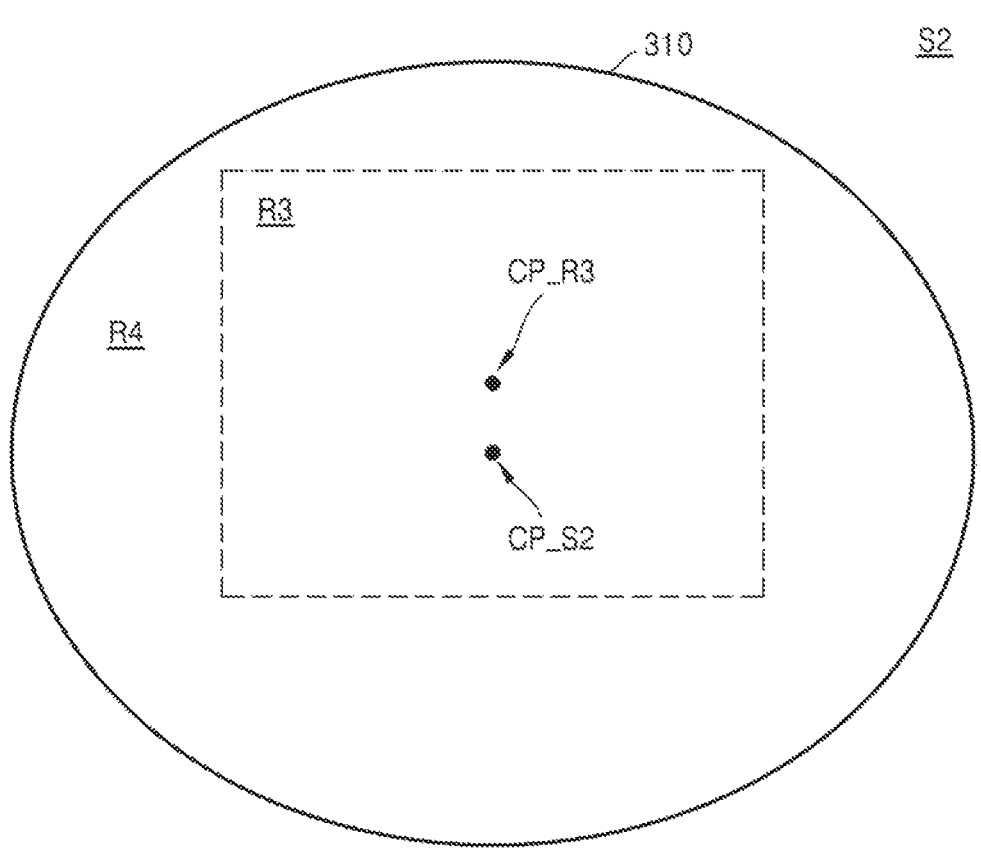
FIG. 7 is a diagram for describing a second surface of the see-through type display device of FIG. 5.

FIG. 5 is a conceptual diagram of a see-through type display device 12 according to an example embodiment. FIG. 6 is a diagram for describing a first surface of the see-through type display device 12 of FIG. 5. FIG. 7 is a diagram for describing a second surface of the see-through type display device 12 of FIG. 5. For brevity of description, substantially the same descriptions as provided with reference to FIGS. 1 to 3 may not be provided.

Referring to FIG. 5, the see-through type display device 12 including the image generator 100, the light path converting device 200, and the light combining device 300 may be provided. The image generator 100 and the light path converting device 200 may be substantially the same as those described with reference to FIG. 1.

The light combining device 300 may include the light combining lens 310. The light combining lens 310 may include the first surface S1 having the first region R1 and the second region R2, and the second surface S2 having the third region R3 and a fourth region. Unlike FIG. 1 and FIG. 2, the first region R1 may be disposed to be biased to one side of the first surface S1. For example, the first region R1 may be disposed to be biased to an upper portion of the first surface S1. The center CP_R1 of the first region R1 may be spaced apart from the center CP_S1 of the first surface S1. For example, the center CP_R1 of the first region R1 may be disposed closer to the display panel 110 than the center CP_S1 of the first surface S1.

Unlike FIG. 3 and FIG. 4, the third region R3 may be disposed to be biased to one side of the second surface S2. For example, the third region R3 may be disposed to be biased to an upper portion of the second surface S2. A center CP_R3 of the third region R3 may be spaced apart from the center CP_S2 of the second surface S2. For example, the center CP_R3 of the third region R3 may be disposed closer to the display panel 110 than the center CP_S2 of the second surface S2.

Example embodiments may provide the see-through type display device 12 including the light combining lens 310 having a reduced curvature. Example embodiments may provide the see-through type display device 12 including the light combining lens 310 having a high degree of freedom in curvature selection.

Figure 8:
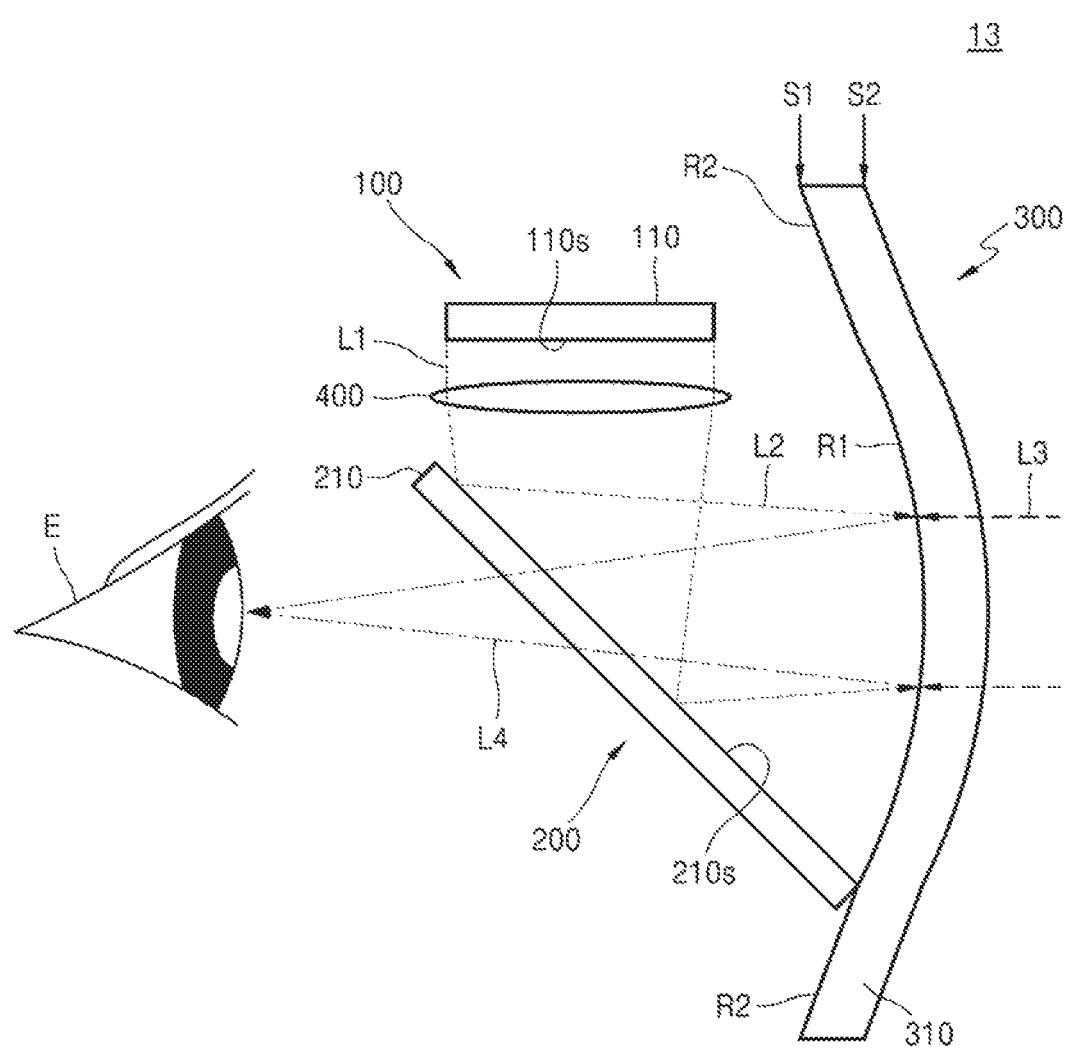
FIG. 8 is a conceptual diagram of a see-through type display device according to an example embodiment.

FIG. 8 is a conceptual diagram of a see-through type display device 13 according to an example embodiment. For brevity of description, substantially the same descriptions as provided with reference to FIGS. 1 to 3 may not be provided.

Referring to FIG. 8, the see-through type display device 13 including the image generator 100, a focusing lens 400, the light path converting device 200, and the light combining device 300 may be provided. The image generator 100 and the light path converting device 200 may be substantially the same as those described with reference to FIG. 1.

The focusing lens 400 may receive the first image light L1 from the display panel 110. The first image light L1 may pass through the focusing lens 400. The focusing lens 400 may focus the first image light L1. The focusing lens 400 may generate an effect of reducing a distance along a light path between the display panel 110 and the focus of the combination light L4. In other words, the position of the first focus may become closer to the beam splitter 210 by the focusing lens 400.

The light combining device 300 may include the light combining lens 310. The light combining lens 310 may include the first surface S1 having the first region R1 and the second region R2. In an example, the first region R1 may have a curvature smaller than when the focusing lens 400 is omitted, for example, the example embodiment described with reference to FIG. 1. Accordingly, the position of the first focus may be farther from the beam splitter 210. For example, the curvature of the first region R1 may be determined such that the first focus point is at a position when the focusing lens 400 is omitted. That is, the light combining lens 310 may compensate for the effect of the focusing lens 400 changing the position of the first focus point.

Example embodiments may provide the see-through type display device 13 including the light combining lens 310 having a reduced curvature. Example embodiments may provide the see-through type display device 13 including the light combining lens 310 having a relatively high degree of freedom in curvature selection.

Figure 9:
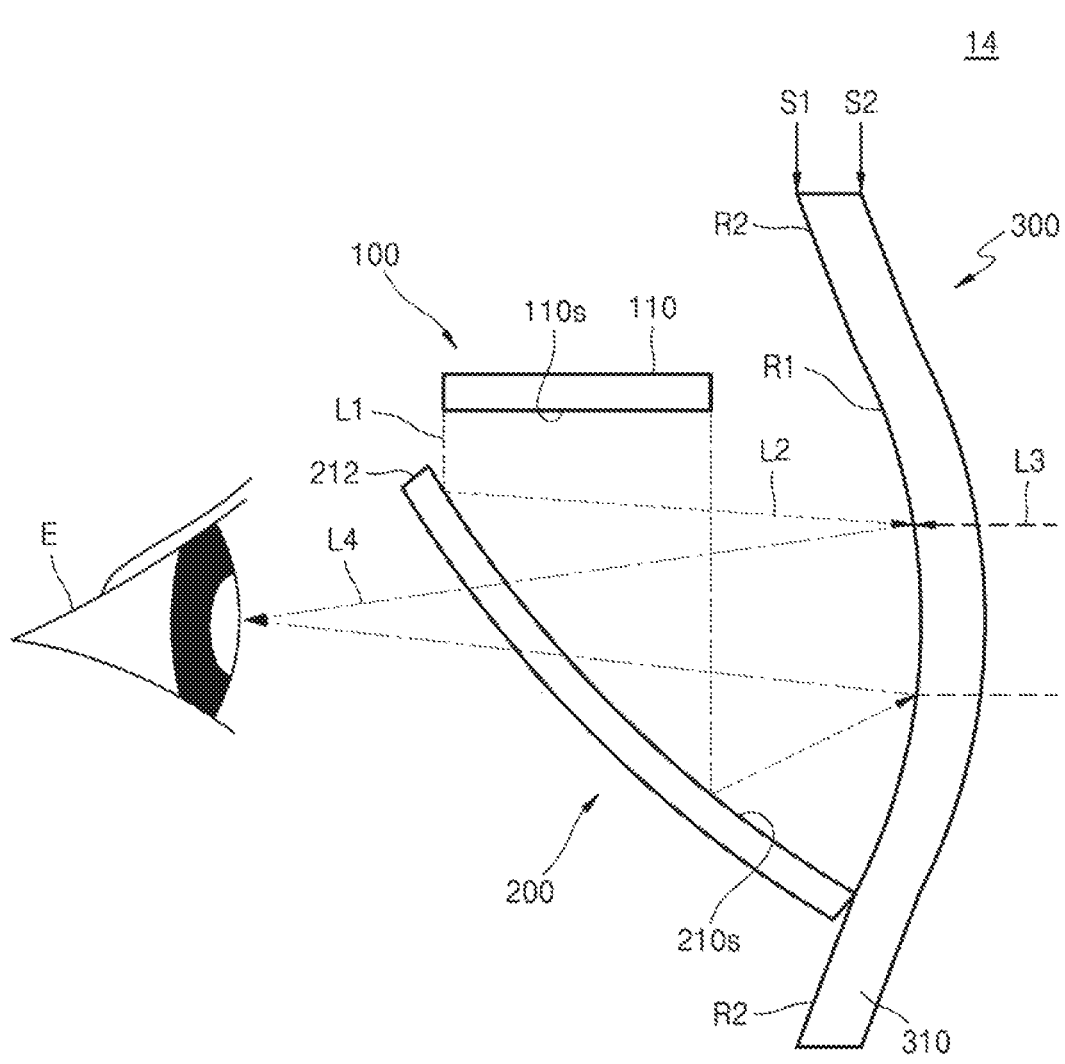
FIG. 9 is a conceptual diagram of a see-through type display device according to example embodiments.

FIG. 9 is a conceptual diagram of a see-through type display device 14 according to an example embodiment. For brevity of description, substantially the same descriptions as provided with reference to FIGS. 1 to 3 may not be provided.

Referring to FIG. 9, the see-through type display device 14 including the image generator 100, the light path converting device 200, and the light combining device 300 may be provided. The image generator 100 may be substantially the same as described with reference to FIG. 1.

The light path converting device 200 may include a beam splitter 212. Unlike the description with reference to FIG. 1, an incidence surface 212s of the beam splitter 212 may be a concave surface. The beam splitter 212 may reflect a part of the first image light L1 and may focus the part of the first image light L1. The beam splitter 212 may generate an effect of reducing a distance along a light path between the display panel 110 and the focus point of the combination light L4. In other words, the position of the first focus point may become closer to the beam splitter 212 by the beam splitter 212.

The light combining device 300 may include the light combining lens 310. The light combining lens 310 may include the first surface S1 having the first region R1 and the second region R2. In an example, the first region R1 may have a curvature smaller than when the incidence surface 212s of the beam splitter 212 is planar, for example, the example embodiment described with reference to FIG. 1. Accordingly, the position of the first focus point may be farther from the beam splitter 212. For example, the curvature of the first region R1 may be determined such that the first focus is at a position when the incidence surface 212s of the beam splitter 212 is planar. That is, the light combining lens 310 may compensate for the effect of changing the position of the first focus by the fact that the incidence surface 212s of the beam splitter 212 is a concave surface.

Example embodiments may provide the see-through type display device 14 including the light combining lens 310 having a reduced curvature. Example embodiments may provide the see-through type display device 14 including the light combining lens 310 having a relatively high degree of freedom in curvature selection.

Figure 10:
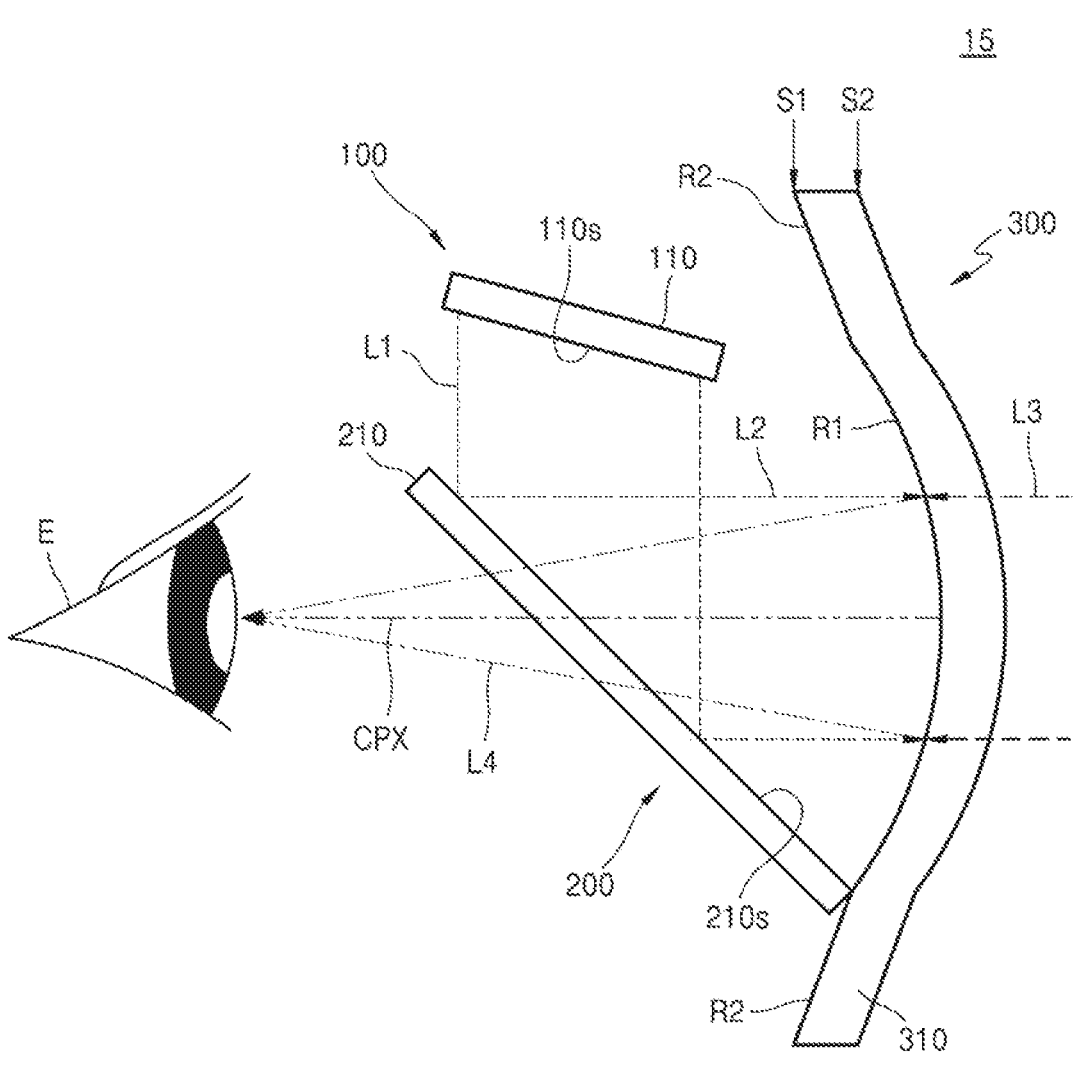
FIG. 10 is a conceptual diagram of a see-through type display device according to an example embodiment.

FIG. 10 is a conceptual diagram of a see-through type display device 15 according to an example embodiment. For brevity of description, substantially the same descriptions as provided with reference to FIGS. 1 to 3 may not be provided.

Referring to FIG. 10, the see-through type display device 15 including the image generator 100, the light path converting device 200, and the light combining device 300 may be provided. The light path converting device 200 and the light combining device 300 may be substantially the same as those described with reference to FIGS. 1 to 3.

The image generator 100 may include the display panel 110. Unlike the description with reference to FIG. 1, the display panel 110 may be disposed to be non-parallel to the central axis CPX of the first region R1.

Example embodiments may provide the see-through type display device 15 including the light combining lens 310 having a reduced curvature. Example embodiments may provide the see-through type display device 15 including the light combining lens 310 having a relatively high degree of freedom in curvature selection.

Figure 11:
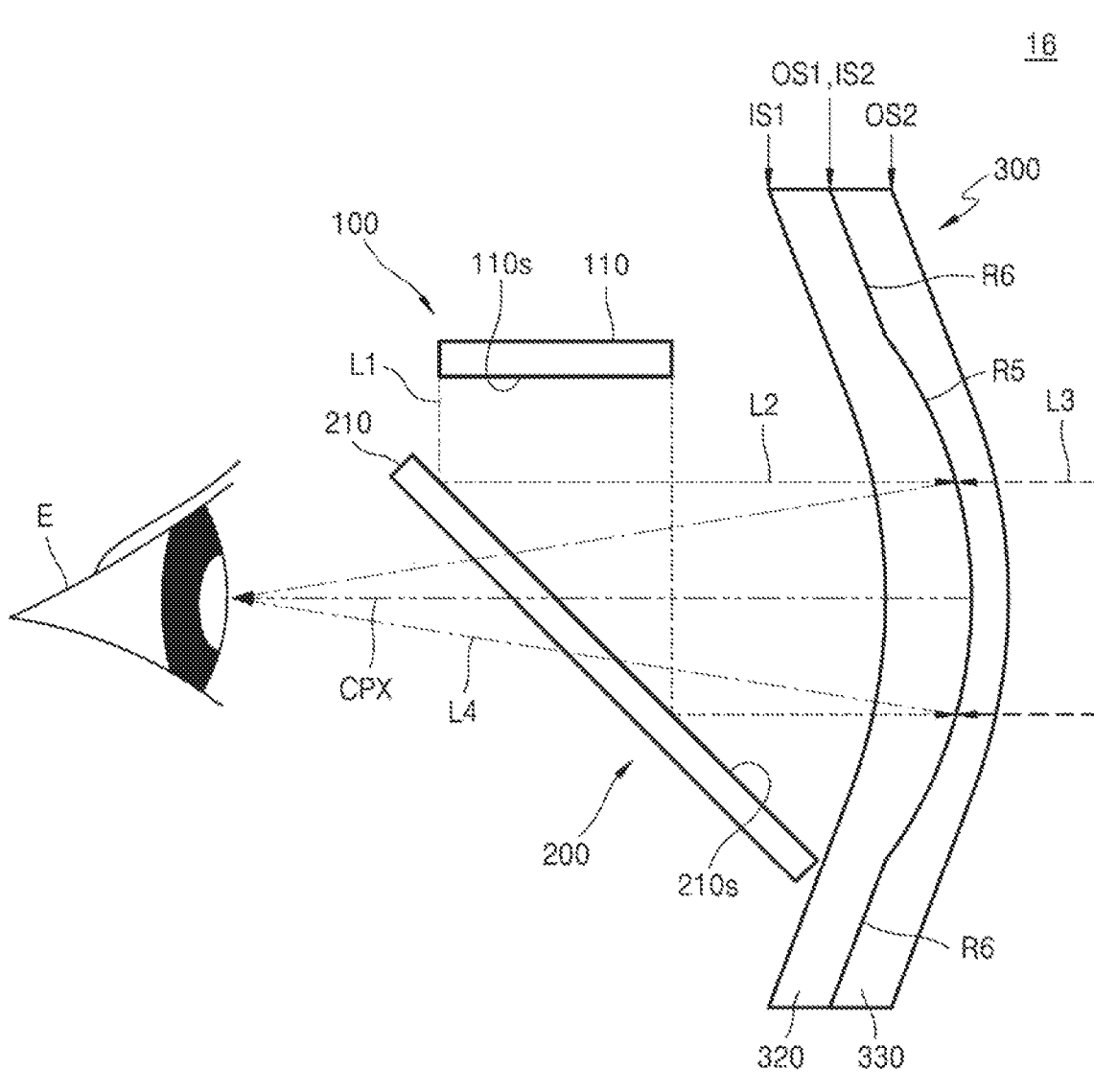
FIG. 11 is a conceptual diagram of a see-through type display device according to an example embodiment.

FIG. 11 is a conceptual diagram of a see-through type display device 16 according to an example embodiment. For brevity of description, substantially the same descriptions as provided with reference to FIGS. 1 to 3 may not be provided.

Referring to FIG. 11, the see-through type display device 16 including the image generator 100, the light path converting device 200, and the light combining device 300 may be provided. The image generator 100 and the light path converting device 200 may be substantially the same as those described with reference to FIG. 1.

The light combining device 300 may include an inner lens 320 and an outer lens 330. The inner lens 320 and the outer lens 330 may be bonded to each other. The radius of the inner lens 320 may be substantially the same as the radius of the outer lens 330. The inner lens 320 may include a first inner surface IS1 facing the beam splitter 210 and a first outer surface OS1 disposed opposite to the first inner surface IS1. The outer lens 330 may include a second inner surface IS2 facing the inner lens 320 and a second outer surface OS2 disposed opposite to the second inner surface IS2.

Each of the first inner surface IS1 and the second outer surface OS2 may have a single curved profile. In an example, the curved profile of the first inner surface IS1 may be substantially the same as the curved profile of the second outer surface OS2.

The second inner surface IS2 may be substantially the same as the first surface S1 described with reference to FIGS. 1 and 2. The second inner surface IS2 may be an aspherical surface. The second inner surface IS2 may include a fifth region R5 and a sixth region R6 having different curved profiles. The fifth region R5 may be substantially the same as the first region R1 described with reference to FIGS. 1 and 2. The sixth region R6 may be substantially the same as the second region R2 described with reference to FIGS. 1 and 2.

The first outer surface OS1 may be bonded to the second inner surface IS2. Accordingly, the first outer surface OS1 may have a curved profile opposite to the second inner surface IS2.

Example embodiments may provide the see-through type display device 16 including a light combining lens having a reduced curvature. Example embodiments may provide the see-through type display device 16 including the light combining lens having a relatively high degree of freedom in curvature selection.

Figure 12:
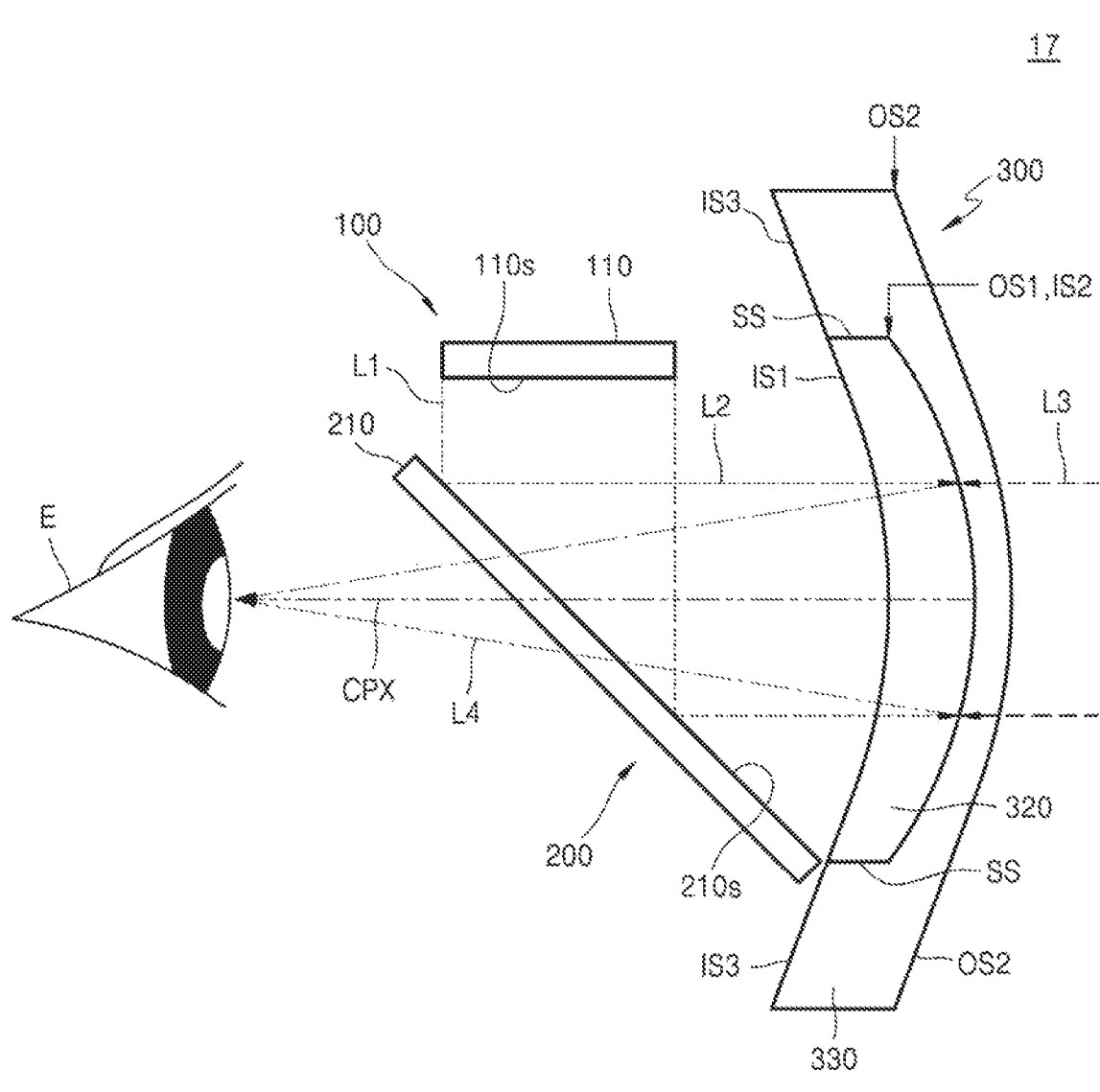
FIG. 12 is a conceptual diagram of a see-through type display device according to an example embodiment.

FIG. 12 is a conceptual diagram of a see-through type display device 17 according to an example. For brevity of description, the descriptions substantially the same as those provided with reference to FIGS. 1 to 3 and 11 may not be provided.

Referring to FIG. 12, the see-through type display device 17 including the image generator 100, the light path converting device 200, and the light combining device 300 may be provided. The image generator 100 and the light path converting device 200 may be substantially the same as those described with reference to FIG. 1.

The light combining device 300 may include the inner lens 320 and the outer lens 330. Unlike the description with reference to FIG. 11, the radius of the outer lens 330 may be greater than the radius of the inner lens 320. The outer lens 330 may surround a side surface SS of the inner lens 320. The side surface SS of the inner lens 320 may connect the first inner surface IS1 to the first outer surface OS1.

The second inner side surface IS2 of the outer lens 330 may have a single curved profile. For example, the single curved profile may be substantially the same as the curved profile of the first region R1 described with reference to FIG. 1.

The outer lens 330 disposed on the side surface SS of the inner lens 320 may include a third inner surface IS3. The third inner surface IS3 may be coplanar with the first inner surface IS1. The curved profile, curvature, and curvature radius of the third inner surface IS3 may be substantially the same as the curved profile, curvature, and curvature radius of the first inner surface IS1, respectively.

Example embodiments may provide the see-through type display device 17 including a light combining lens having a reduced curvature. Example embodiments may provide the see-through type display device 17 including the light combining lens having a relatively high degree of freedom in curvature selection.

Figure 13:
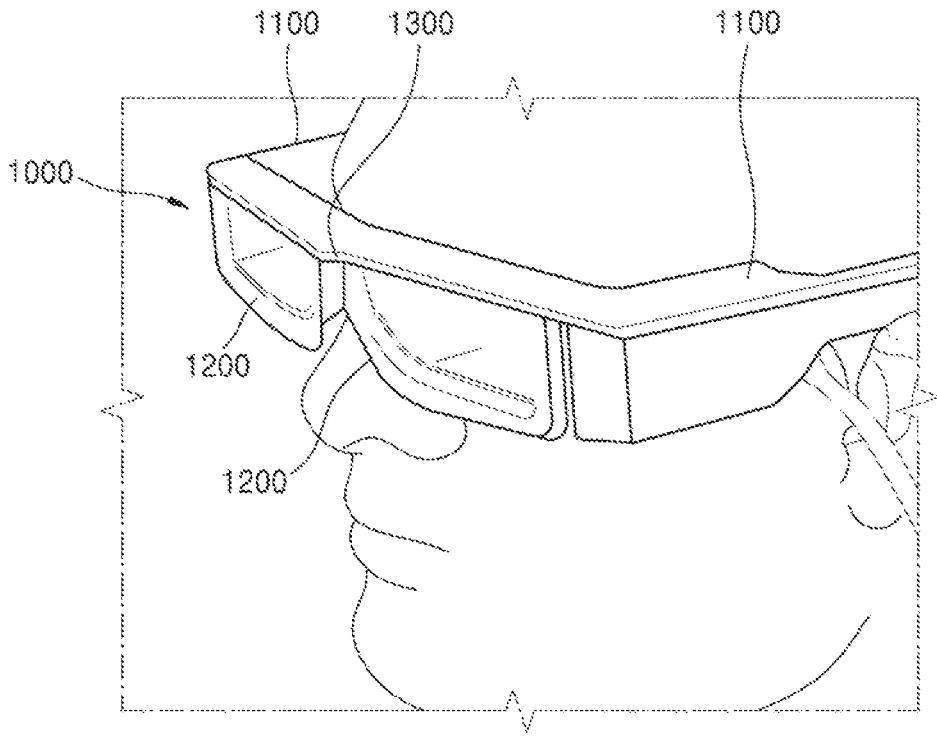
FIG. 13 is a conceptual diagram of a glasses type augmented reality (AR) device according to an example embodiment.

FIG. 13 is a conceptual diagram of a glasses type augmented reality (AR) device 1000 according to embodiments. For brevity of description, substantially the same descriptions as provided above may not be provided.

Referring to FIG. 13, the glasses type AR device 1000 including a pair of temples 1100, a pair of light combining lenses 1200, and a bridge 1300 may be provided. The pair of temples 1100 may extend in one direction. The pair of temples 1100 may extend in parallel. The pair of temples 1100 may be spaced apart from each other. In example embodiments, the pair of temples 1100 may fold towards the bridge 1300.

The pair of light combining lenses 1200 may be provided between the pair of temples 1100. The pair of light combining lenses 1200 may be connected to the pair of temples 1100, respectively. Each of the pair of light combining lenses 1200 may be substantially the same as a light combining lens of the see-through type display devices 11, 12, 13, 14, and 15 described above, or a combined lens of the inner lens 320 and the outer lens 30 of the see-through type display devices 16 and 17.

The bridge 1300 may be provided between the pair of light combining lenses 1200. The bridge 1300 may connect the pair of light combining lenses 1200 to each other.

A pair of beam splitters may be provided between the pair of light combining lenses 1200 and a user. Each of the pair of beam splitters may be substantially the same as a beam splitter of the see-through type display devices 11, 12, 13, 14, 15, 16, and 17 described above.

The glasses type AR device 1000 may include an image generator. The image generator may be substantially the same as an image generator of the see-through type display devices 11, 12, 13, 14, 15, 16, and 17 described above.

In an example, the glasses type AR device 1000 may further include a focusing lens described with reference to FIG. 8.

A light combining lens used as a combining device of a glasses type AR device may have a greater curvature than a general glasses lens. Accordingly, when the light combining lens is disposed at the outermost portion of the glasses type AR device, for example, the lens portion of glasses, the glasses type AR device may look different from general glasses.

Example embodiments may provide the glasses type AR device 1000 in which the pair of light combining lenses 1200 having a region having a relatively large curvature and a region having a relatively small curvature are disposed in the lens portion of the glasses. The pair of light combining lenses 1200 may have a curved profile similar to a general glasses lens. Accordingly, the glasses type AR device 1000 may look like general glasses.

Example embodiments may provide the glasses type AR device 1000 in which the pair of light combining lenses 1200 having a region having a relatively large curvature and a region having a relatively small curvature are disposed at positions of lenses of general eyeglasses.

Example embodiments may provide a see-through type display device including a light combining lens having a relatively high degree of freedom in curvature selection.

Example embodiments may provide a glasses type AR device that arranges the light combining lens at the lens position of the glasses.

However, the effects of the embodiments are not limited to the above disclosure.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A see-through type display device comprising:
an image generator configured to generate first image light;
a light path converting device configured to reflect the first image light to generate second image light; and
a light combining device configured to reflect and focus the second image light,
wherein the light combining device comprises:
an inner lens adjacent to the light path converting device; and
an outer lens provided opposite to the light path converting device with respect to the inner lens, the outer lens being a single lens,
wherein an inner surface of the outer lens and an outer surface of the inner lens are bonded to each other,
wherein each of the inner surface of the outer lens and the outer surface of the inner lens is aspherical,
wherein an outer surface of the outer lens has a single curved profile,
wherein the inner surface of the outer lens comprises:
a first region having a uniform first curvature, the first region corresponding to an inner region of the inner surface; and
a second region surrounding the first region and having a uniform second curvature that is different from the first curvature, the second region corresponding to an outer region of the inner surface,
wherein the first curvature is a spherical curvature and the second curvature is an ellipsoidal curvature, and
wherein a position of an upper boundary of the first region is determined based on relative positions of the image generator and the light path converting device,
wherein the relative positions of the image generator and the light path converting device are determined such that the second image light passing through a trajectory closest to the image generator among trajectories of the second image light is incident on the upper boundary of the first region,
wherein the second image light is configured not to be incident on the second region located above the upper boundary of the first region, wherein an inner surface of the inner lens configured to face a user, and wherein real image light emitted from a real object is directly incident on the outer surface of the outer lens, passes through the light combining device, and is provided to the user, and wherein the outer surface of the outer lens is disposed at an outermost side of the see-through type display device, such that the outer surface of the outer lens is exposed to an external environment.

2. The see-through type display device of claim 1, wherein the second curvature of the second region is smaller than the first curvature of the first region.

3. The see-through type display device of claim 1, wherein a curved profile of the outer surface of the inner lens is opposite to a curved profile of the inner surface of the outer lens.

4. The see-through type display device of claim 1, wherein a radius of the inner lens is equal to a radius of the outer lens.

5. The see-through type display device of claim 1, wherein a radius of the inner lens is smaller than a radius of the outer lens.

6. The see-through type display device of claim 5, wherein the inner lens is provided on the first region, and wherein the second region is exposed by the inner lens.

7. The see-through type display device of claim 5, wherein the outer lens covers a side surface of the inner lens, and wherein the side surface of the inner lens connects the outer surface of the inner lens to the inner surface of the inner lens provided opposite to the outer surface of the inner lens.

8. The see-through type display device of claim 7, wherein the second region is coplanar with the inner surface of the inner lens.

9. The see-through type display device of claim 8, wherein the second curvature of the second region is equal to a curvature of the inner surface of the inner lens.

* * * * *